UNITED STATES PATENT OFFICE.

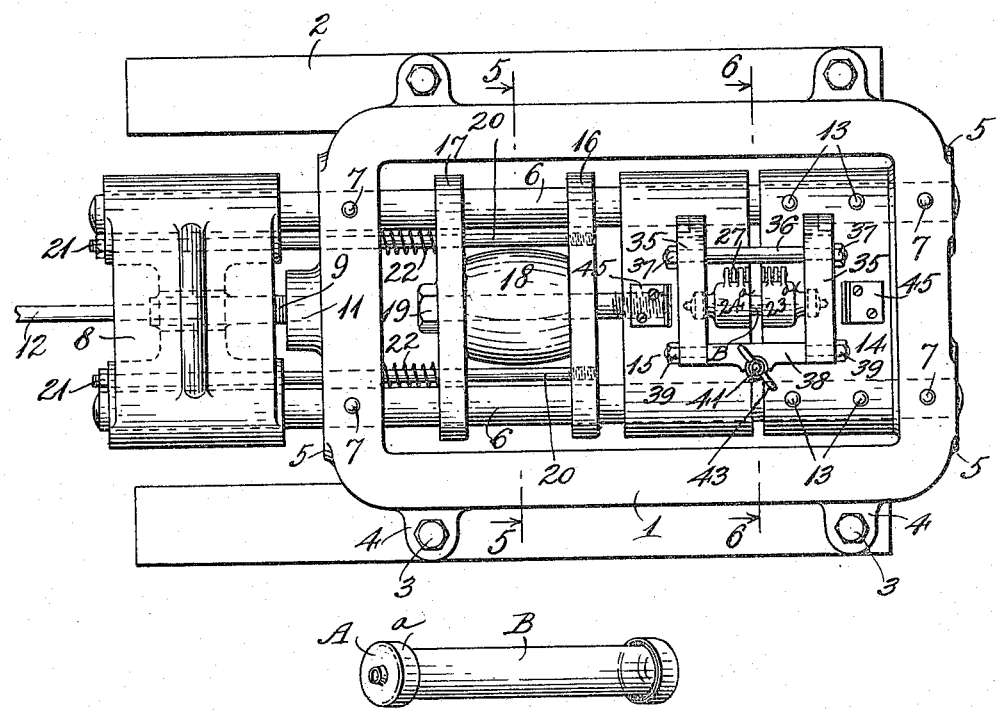

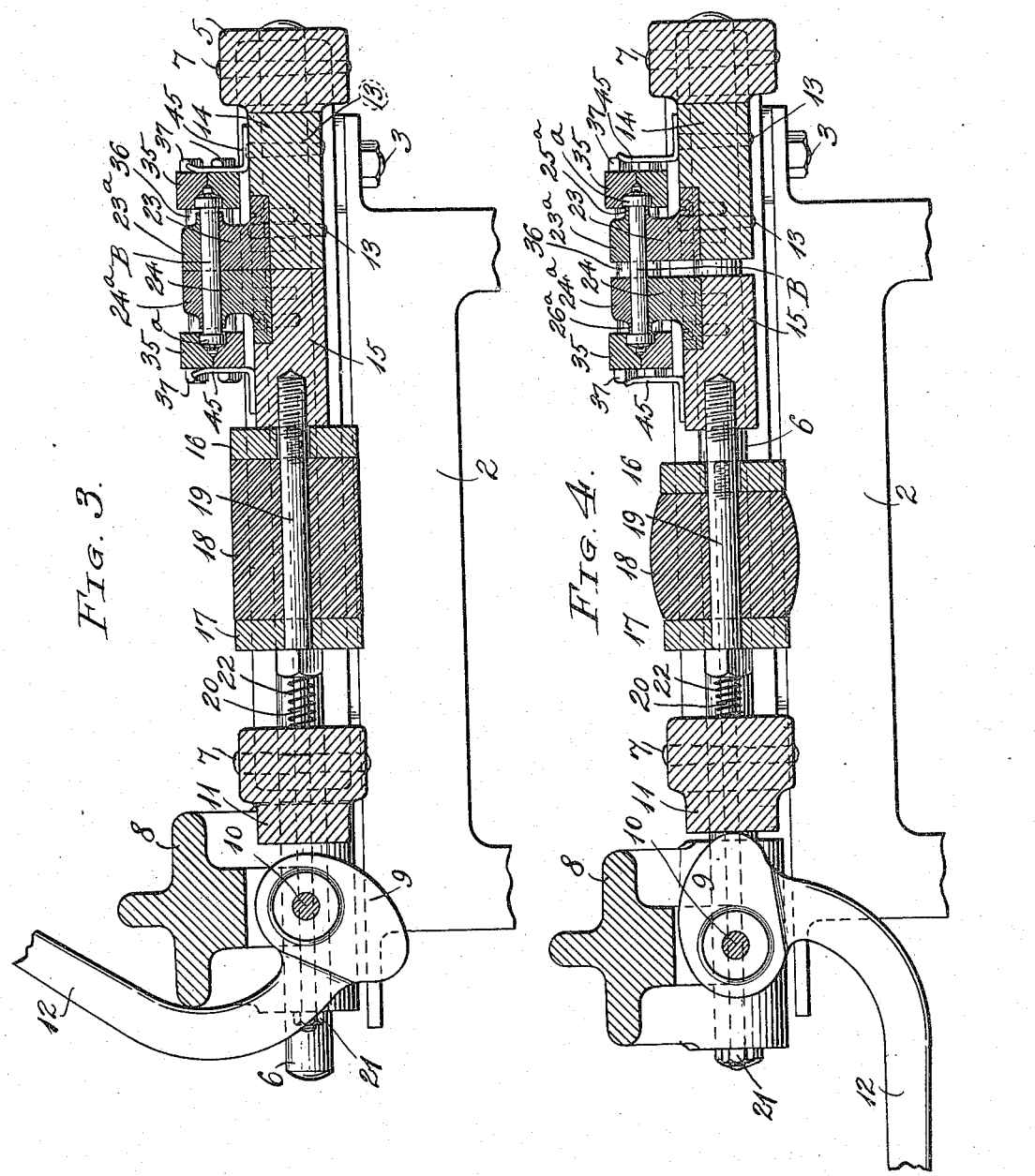

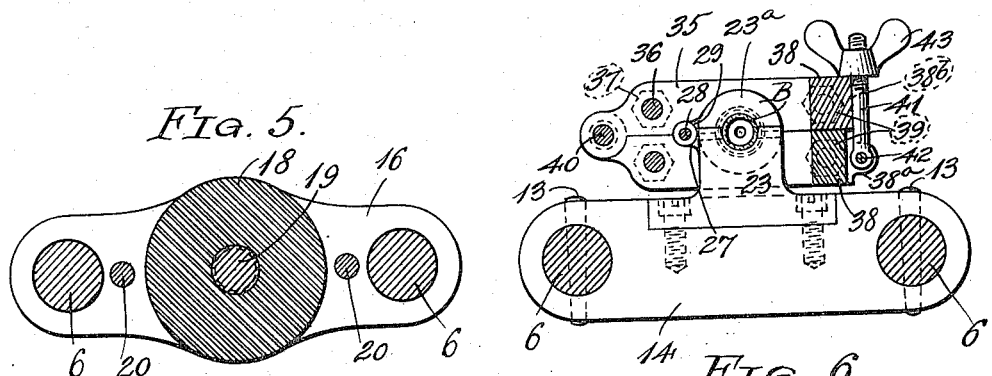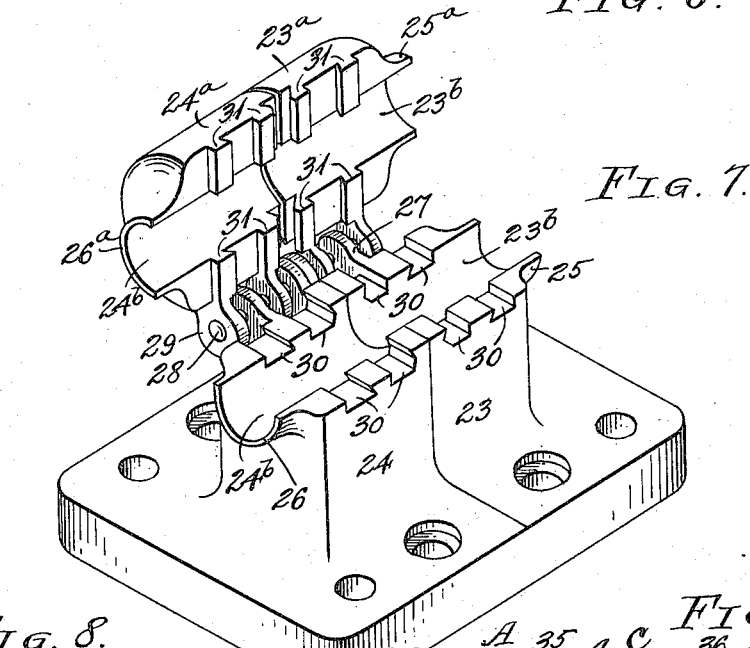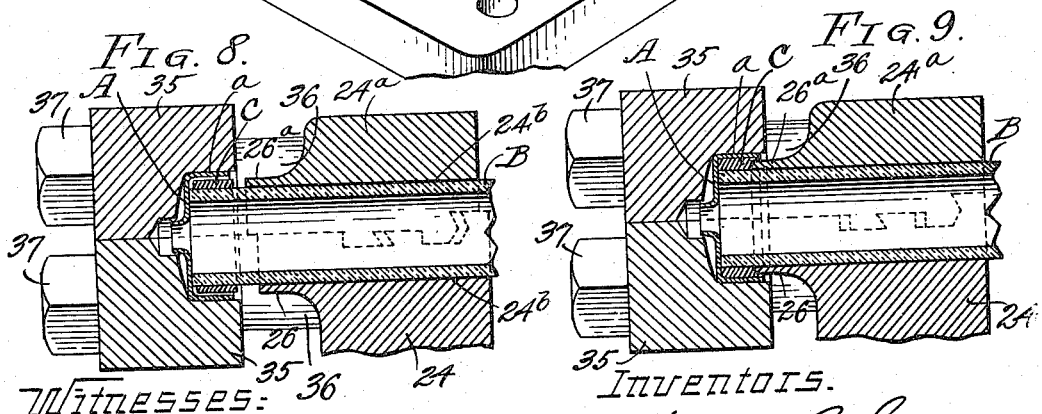

WILLIAM R. JEAVONS AND ARNOLD R. WHITTAKER, OF CLEVELAND, OHIO.

CALKING-MACHINE.

1,152,513.  Specification of Letters Patent.  Patented Sept. 7, 1915.

Application filed April 10, 1913.  Serial No. 760,324.

*To all whom it may concern:*

Be it known that we, WILLIAM R. JEAVONS and ARNOLD R. WHITTAKER, citizens of the United States, residing at Cleveland, in the county of Cuyahoga and State of Ohio, have invented a certain new and useful Improvement in Calking-Machines, of which the following is a full, clear, and exact description, reference being had to the accompanying drawings.

This invention relates to apparatus for producing calked joints between members of fragile material and members of rigid material, such, for instance, as the joints formed between gage tubes of liquid-level indicators and the metallic caps or fittings which embrace the ends thereof wherein the calking is accomplished by the pressing or crowding of lead or similar ductile material between the ends of the tubes and the coöperating parts of the caps. In the performance of this operation, it is required that only sufficient pressure be applied to the lead to cause it to be firmly squeezed or crowded into and distributed throughout the space which it is adapted to fill, to form an absolutely tight joint, any pressure in excess of this being not only unnecessary but subjecting the tube to the danger of breakage.

It is the object of this invention to provide an apparatus for the purpose above mentioned which is efficient in the accomplishment of its work; easy to operate; of simple and substantial construction; and one wherein a yielding pressure of limited force is brought to bear upon the calking material upon each complete operation of the apparatus.

Another object is to provide, in an apparatus of the above character, means within which the caps of the gage tubes are confined and supported during the calking operation, whereby their original shape is maintained.

Further objects will become apparent as this description proceeds.

Generally speaking our invention may be defined as consisting of the combinations of elements set forth in the claims annexed hereto and illustrated in one form in the accompanying drawings forming part hereof, wherein—

Figure 1 is a plan view of our apparatus in operative condition; Fig. 2 is a side elevation of the same; Fig. 3 represents a central longitudinal section of the apparatus in inoperative condition; Fig. 4 is a similar view, but with the parts in operative position, as shown in Figs. 1 and 2; Fig. 5 is a transverse sectional view taken on the line 5—5 of Fig. 1 and looking in the direction indicated by the arrows; Fig. 6 is a similar view taken on the line 6—6 of Fig. 1 and looking in the direction indicated by the arrows; Fig. 7 is a perspective of the gage-tube supporting means; Figs. 8 and 9 are sectional details through adjacent parts of the cap retaining and tube supporting means, the calking operation being illustrated thereby; and Fig. 10 is a perspective view of one type of liquid level gage, the joints of which are calked by the apparatus of our invention.

In the drawings, in which like reference characters designate corresponding parts through the several views, 1 represents a rectangular frame which is supported by side members 2, it being secured to the horizontal top flanges of said members by bolts 3 which pass through said flanges and through lugs 4 which extend laterally from the sides of said frame near its corners. Each end of the frame 1 is provided with a pair of bosses 5 which are bored to receive a pair of bars 6 which are retained firmly in place by pins 7 which pass through the bosses 5 and the said bars. The left hand ends of the bars 6 (as viewed in Figs. 1 to 4 of the drawings) project beyond the end of the frame 1 and have slidably mounted thereon a cross-head 8 within which a cam 9 is pivoted upon a pin 10. The face of the cam is adapted to coöperate with the face of a boss 11, which extends from the left hand end of the frame 1 toward the crosshead, when said cam is rocked upon its pivot by the swinging of its arm 12. Upon such operation of the cam 9 the crosshead 8 is caused to slide upon the bars 6 away from the frame 1.

Secured to the bars 6 by the pins 13, just inside the right hand end of the frame 1, is a block 14, as shown clearly in Figs. 1 and 6. A similar block 15 is slidably mounted upon the bars 6 alongside the block 14 and is adapted to be moved against and away from said block in a manner which will hereinafter be made clear. A pair of plates 16 and 17 are also movably supported upon the bars 6, the former resting substantially against the adjacent face of the block 15 when the parts are in normal position. Interposed between the plates 16 and 17 is a cushion 18 of resilient material, preferably rubber, which is retained in place by a bolt 19 passing through the plate 17, the cushion 18, and the plate 16 and threaded into the block 15.

A pair of tension rods 20, which are threaded at their right hand ends into the plate 16, pass freely through holes in the plate 17, the left hand end of the frame 1, and through the crosshead 8 in juxtaposition to the bars 6, and are provided beyond the crosshead with nuts 21. A pair of compression springs 22 surround a portion of the rods 20 and are confined between the plate 17 and the left hand end of the frame 1.

Mounted within depressions in the adjacent edges of the upper faces of the blocks 14 and 15 are the base plates of jaws 23 and 24, respectively, and these jaws, with their respective covers 23$^a$ and 24$^a$, form a support and a part of the calking means for the gage tubes, a space being provided for said tubes by the semi cylindrical grooves 23$^b$ and 24$^b$ which are formed respectively in the upper and lower faces of the jaws and their covers (see Fig. 7). Projecting from the opposite ends of the jaws 23 and 24 are semi-circular lips 25 and 26, respectively, which are identical with a pair of lips 25$^a$ and 26$^a$ which project from the opposite ends of the covers of said jaws. Lugs 27 which extend from the upper portion of the rear face of the jaws 23 and 24 carry hinge pintles 28 upon which the lugs 29 of the covers 23$^a$ and 24$^a$ are pivotally supported. These pintles are of sufficient length to permit longitudinal movement of the covers with respect to the jaws, as will be seen upon an inspection of Fig. 1. The portions of the upper faces of the jaws 23 and 24 which are located at either side of the grooves 23$^b$ and 24$^b$ are provided with a series of transverse, substantially dovetailed grooves 30, that wall of each of the grooves which is toward the lip-provided end of its jaws being vertical. The adjacent faces of the covers 23$^a$ and 24$^a$ are provided with projections 31 of a shape corresponding to the shape of the notches 30 and are adapted to occupy said notches when the covers are in closed position, the width of the lower face of each of the projections being slightly less than the width between the upper edges of the notches. The longitudinal movement previously mentioned, which is permitted between the covers and the jaws by the length of the hinge pintles 28, provides for the engagement of the inclined walls of the projections and notches to produce a locking action between the jaws and their covers when the jaws are longitudinally separated.

We provide, in connection with the tube-supporting jaws and their covers, a retaining means for the caps of the gage tubes, which comprises a pair of horizontal hinged frames, each of said frames being composed of two end members 35, the rear ends of which are spaced apart and connected by a rod 36 which is reduced at each end to form shoulders against which the inner faces of the end members may abut, the ends of the reduced portions of said rod being threaded for the reception of nuts 37 which firmly clamp the end members against said shoulders. For convenience of description, the lower part of the machine in Fig. 1 will be referred to as the "front" of the machine and the upper part as the "rear", and like terms will be employed to designate the hinged frames thereon. The front ends of the members 35 are connected in substantially the same manner, by the bars 38 which are rectangular in cross section. The ends of these bars are also reduced and threaded in a similar manner to that just described in connection with the rods 36 and carry nuts 39. The rear ends of the members 35 are reduced in width and overlap each other where they are hinged together by rivets 40. To firmly lock together the front sides of the frames which are formed by the bars 38, we provide an eye bolt 41 which is pivoted at 42 between ears 38$^a$ projecting from the front side of the lower bar 38, and the opposite end of the bolt 41 is threaded for the application of a wing nut 43 and is adapted to swing into a notch between the lugs 38$^b$ which project from the front side of the upper bar 38, directly above the ears 38$^a$. About midway between the rods 36 and the bars 38 the adjacent edges of the inner faces of the members 35 are provided with semi-circular recesses which, when the frames are in closed position, form a circular recess in which the flanges $a$ of the end caps A of the gage tubes B may be confined.

Carried by the blocks 14 and 15 beyond the ends of the jaws 23 and 24 and spaced a distance apart equal to the length of the aforesaid hinged frames are a pair of angle plates 45 which have their vertical portions slightly curved away from the jaws. These plates provide a convenient means for correctly locating the frame and the tube carried thereby within the jaws.

To perform the operation of calking the joints at the ends of a gage tube and within the flanges of its caps by the use of our apparatus, the gage tube is first assembled by placing the caps over the ends of the tube, inserting between the adjacent parts of the tube and the flange of each cap a ring of some soft metal, such as lead. The assembled gage is then placed within the retaining frames with the caps A occupying the recesses in the end members 35 of the frames, and the frames are then securely locked together by the bolt 41. The gage tube is then placed within the grooves 23ᵇ, 24ᵇ in the upper faces of the jaws 23 and 24 respectively, the covers of the jaws being raised subsequent to the last operation of the machine. The covers are then lowered with their projections 31 occupying the recesses 30 in the upper faces of the jaws. At this time the straight sides of the projections 31 are adjacent to the corresponding sides of the notches 30, and the lips 25ᵃ and 26ᵃ of the covers protrude somewhat beyond the lips 25 and 26 of the jaws. The operating arm 12 is then swung downwardly to cause the cam 9 to engage the face of the boss 11 and move the cross-head 8 away from the frame 1. The rear face of the cross-head engaging the nuts 21 on the rods 20 causes said rods to be moved with the cross-head, which movement is transmitted through said rods to the plate 16 to which the ends of said rods are secured. This movement of the plate 16 causes a compression of the cushion 18 and the transmission of a part of the movement of said plate to the plate 17. By the engagement of the plate 17 with the bolt 19 the movement of this plate is transmitted through said bolt to the block 15 into which the bolt is threaded and which block carries the jaw 24.

As the blocks 14 and 15, and consequently the jaws 23 and 24, separate, the lips 25, 25ᵃ and 26, 26ᵃ engage the edges of the lead rings C and squeeze or press them into place between the flanges a of their caps and the adjacent surfaces of the tube B, distributing the soft metal throughout this space and producing an absolutely tight joint. Upon the initial engagement of the lips 25ᵃ and 26ᵃ with the lead rings, the covers 23ᵃ and 24ᵃ which carry said lips are moved toward each other until the inclined faces of the projections 31 interlock with the inclined sides of the notches 30 to effect a locking of the covers in closed position. This movement of the covers also properly alines their lips with the lips on the jaws.

It will be seen from the foregoing description that the pressure which is brought to bear upon the calking material and the parts adjacent thereto is determined by the resiliency of the cushion 18 rather than by the force that is applied to the operating handle 12, and the resiliency of said cushion should be in proportion to the strength of the gage tube. Moreover the cushion acts as a snubber or absorber for any shock produced by a quick operation of the cam and transmits such shock to the parts which are acted upon by a constrained and even pressure, eliminating the danger of breakage to which the tube would be subjected were the original and quicker action of the cam transmitted thereto. After the joints have thus been calked, the operating arm 12 is returned to its normal position, which causes the cam to swing out of engagement with the boss 11, and the other parts are thereupon returned to normal position by the pressure of the springs 22, which are confined between the plate 17 and the adjacent end of the frame 1. In the event that the lips stick within the calking material and thereby tend to shift the retaining frames, the return of the plate 45 which is carried by the block 15 shifts said frames to a central position or until their opposite ends are in engagement with the other plate 45. When in this position, the frames with the gage may be lifted from the jaws, the covers thereof swinging to open position to permit of such removal. The frames are then opened so that the finished gage tube may be removed therefrom.

Having thus described our invention, what we claim is:—

1. In an apparatus of the character set forth, the combination, with calking means comprising separable members, of operating mechanism therefor including a reciprocating member, yielding means whereby a part of the movement of the reciprocating member is transmitted to the calking means to cause its members to separate, said yielding means comprising a pair of plates and a resilient cushion interposed therebetween, one of the plates being connected with the reciprocating member and the other with the calking means, and a device whereby the joint to be calked is supported during the operation of the calking means.

2. In an apparatus of the character set forth, the combination, with calking means comprising a stationary and a reciprocating member, of operating mechanism therefor including a member which is adapted to move in alinement with the aforesaid reciprocating member, means for transmitting motion from the movable member to the reciprocating member, the last-mentioned means comprising a pair of plates having a resilient device interposed therebetween, the plate farthest removed from the movable member being connected therewith and there being a connection between the reciprocating member and the plate farthest therefrom, and a device within which the joint to be calked may be supported.

3. In an apparatus of the character set forth, the combination, with a frame, of a pair of stationary bars supported thereby, calking means comprising separable members one of which is secured to the aforesaid bars and the other movable thereon, operating mechanism for said calking means comprising a cross head which is adapted to be reciprocated on the bars, a cam carried by the cross head and having engagement with a part of the aforesaid frame, a pair of plates slidably mounted upon the bars intermediate of the cross head and the movable member of the calking means, a block of resilient material interposed between the said plates, a pair of rods connecting the cross head with the plate farthest removed therefrom, means connecting the movable member of the calking means with the other of said plates, a pair of hinged frames having recesses within their adjacent faces wherein the joint to be calked is adapted to be confined and having means whereby they may be firmly locked together, and a projection carried by the members of the calking means whereby the frames are located.

4. Apparatus to secure flanged caps to tubes by means of calking material compressed between the cap flanges and tube wall comprising, in combination, a pair of tube calking members adapted to surround the tube and engage such calking material, means for holding said caps with their flanges spaced from the tube wall, and yielding means whereby relative longitudinal movement may be secured between said caps and said calking members.

5. In an apparatus of the character set forth, the combination of a pair of calking members adapted to surround the end portions of a tube, a support at each end of said tube and adapted to receive a cap with its flange surrounding the adjacent end portion of the tube, and means for separating the calking members to cause the ends thereof to enter the cap flanges.

6. In an apparatus of the character set forth, the combination of a pair of calking members adapted to extend around the end portions of a tube, a supporting member adjacent to each end of such tube and arranged to receive a cap and hold the same in alinement with the tube, each of said caps having a flange adapted to extend around the tube and define an annular recess surrounding the tube wall, and yielding means for separating the calking members and projecting their end portions into the spaces inclosed by the cap flanges.

7. In an apparatus for securing thin flexible metal caps to tube ends, the combination of a supporting device having a recess adapted to receive and support the walls of the cap, means for supporting the tube in alinement with said cap with its walls spaced from the walls thereof, and means for moving one of said devices toward and from the other.

8. In an apparatus of the character set forth, the combination of a tube support comprising a pair of members having calking ends, a frame adapted to support a pair of caps adjacent to such calking ends, and yielding means for separating the tube supporting members to project the calking ends thereof toward the adjacent cap-supporting portions of the frame.

9. In an apparatus of the character set forth, the combination of a pair of tube supporting members, each member comprising a lower portion and an upper portion and each member having a calking end, a frame having cap-supporting members adjacent to the calking ends of the first-mentioned members, and means for yieldingly separating the tube supporting members to project the calking ends thereof toward the adjacent cap-supporting members of the frame.

10. In an apparatus of the character set forth, the combination of a pair of tube-supporting members, each member comprising a lower portion and an upper portion and each member having a calking end, a frame having cap-supporting members adjacent to the calking ends of the first-mentioned members, means for yieldingly separating the tube supporting members to project the calking ends thereof toward the adjacent cap-supporting members of the frame, and means whereby such motion will interlock the upper and lower portions of the tube-supporting members.

11. In an apparatus of the character set forth, the combination of a tube support, said support comprising a pair of base members each having a tube supporting channel, in its upper face and a calking end and an upper member slidingly hinged to each lower member and having a tube receiving channel in its lower face, said upper members having each a calking end which normally projects beyond the calking end of its coöperating lower member, a cap-supporting frame comprising upper and lower members which are pivotally connected, one pair of upper and lower members being located on one side of the tube supporting device and the other pair of cap supporting members being located on the opposite side of said device, means for separating the lower tube supporting members to project their calking ends toward the adjacent cap supporting members, and interlocking devices carried by the upper and lower tube supporting members and adapted to be engaged when the upper members have been moved a distance to bring their calking ends into substantial alinement with the calking ends of the lower tube supporting members.

12. In an apparatus of the character set forth, the combination of a tube support, said support comprising a base member having a tube supporting channel in its upper face and a calking end and an upper member longitudinally movable with respect to the lower member and having a tube receiving channel in its lower face and having a calking end which normally projects beyond the calking end of its coöperating lower member, a cap support, means for moving one of said supports toward the other, and interlocking devices carried by the upper and lower tube supporting members and adapted to be engaged when the upper member has been moved a distance to bring its calking end into substantial alinement with the calking end of the lower tube supporting member.

13. In an apparatus of the character set forth, the combination of a pair of calking devices, a pair of cap supporting devices adjacent to the ends of the calking devices, and means including a cushion of resilient material for separating the calking devices to bring their ends into operative relation with the cap supporting devices.

14. In an apparatus of the character set forth, the combination of a pair of calking devices, a frame having a cap supporting portion adjacent to the operating ends of the said calking devices, means for separating the calking devices to bring their operating ends into operative relation to the said portions of the frame, and means adapted to engage the frame to disengage the end of a calking device therefrom by the return of said devices to initial position.

15. In an apparatus of the character set forth, the combination of a fixed and a movable base, a pair of members mounted respectively on said bases and having their ends formed as calking devices, a pair of cap supporting devices, one adjacent the calking end of each of the said members, means rigidly connecting the cap supporting devices, means for separating said bases, and devices mounted on said bases and adapted to engage said cap supporting devices when the bases are in their normal or unseparated position.

16. In an apparatus of the character set forth, the combination of a pair of calking devices each having a calking end, a pair of cap supporting devices, means for separating the calking devices to bring their calking ends into operative relation to the cap supporting devices, and means for separating the calking devices and the cap supporting devices.

17. In an apparatus of the character set forth, the combination, with means for supporting a tube and a cap in position to surround and be spaced from the tube, of a calking member surrounding the tube, and yielding connections whereby relative movement may be secured between the calking member and the cap whereby said calking member may enter the space between the cap and the tube.

18. In an apparatus of the character set forth, the combination, with means for supporting a tube and a cap in position to surround and be spaced from the tube, of a calking member surrounding the tube, and means including a resilient cushion for obtaining relative movement between the calking member and the cap whereby said calking member may enter the space between the cap and the tube.

19. In an apparatus of the character set forth, the combination of a pair of spaced cap supporting devices, a device for supporting a tube with its ends within and spaced from the walls of the caps, a pair of calking devices surrounding the tube and each arranged to enter the space between each cap and the end of the tube therewithin, and yielding means for projecting the calking devices toward the cap supporting devices whereby the calking devices may enter the spaces between the caps and the tube ends.

20. In an apparatus of the character set forth, the combination of a pair of spaced cap supporting devices, a device for supporting a tube with its ends within and spaced from the walls of the caps, a pair of calking devices surrounding the tube and each arranged to enter the space between each cap and the end of the tube therewithin, and yielding means for simultaneously projecting the calking devices toward the cap supporting devices whereby the calking devices may enter the spaces between the caps and the tube ends.

In testimony whereof, we hereunto affix our signatures in the presence of two witnesses.

WILLIAM R. JEAVONS.
ARNOLD R. WHITTAKER.

Witnesses:
F. W. RAMSEY,
JOHN B. HULL.

Copies of this patent may be obtained for five cents each, by addressing the "Commissioner of Patents, Washington, D. C."